April 28, 1925.
R. L. REDPATH ET AL
1,536,031
MOLD RAMMING MACHINE
Filed July 6, 1922   6 Sheets-Sheet 1
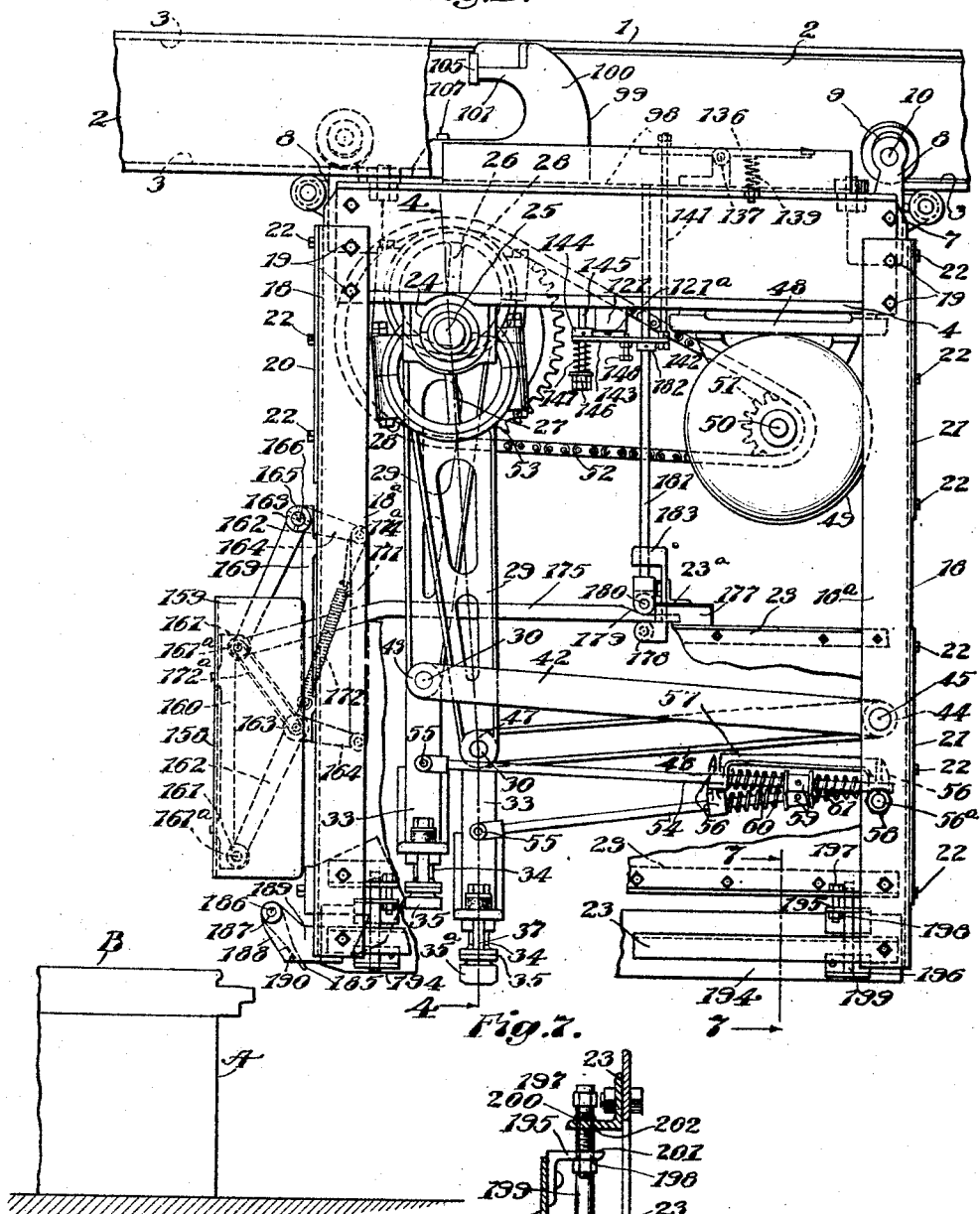
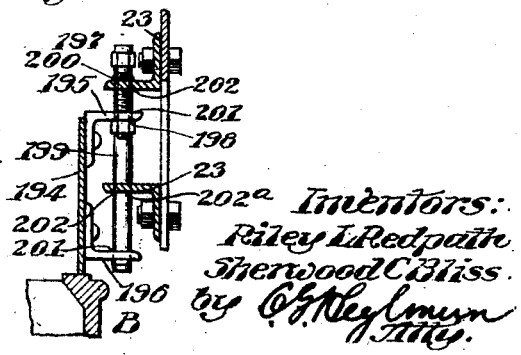
Inventors:
Riley L. Redpath
Sherwood C. Bliss

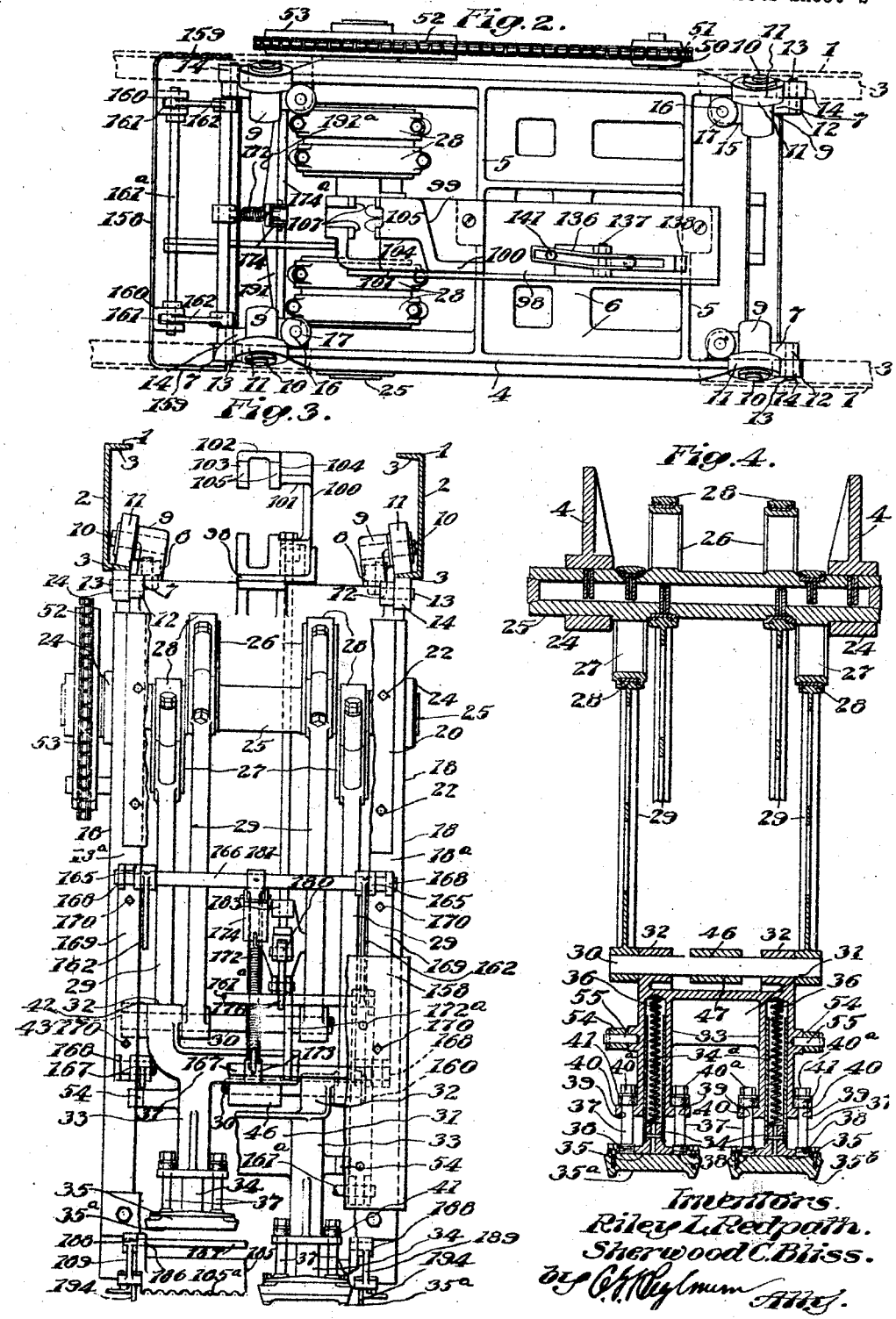

April 28, 1925.
R. L. REDPATH ET AL
MOLD RAMMING MACHINE
Filed July 6, 1922 6 Sheets-Sheet 3
1,536,031
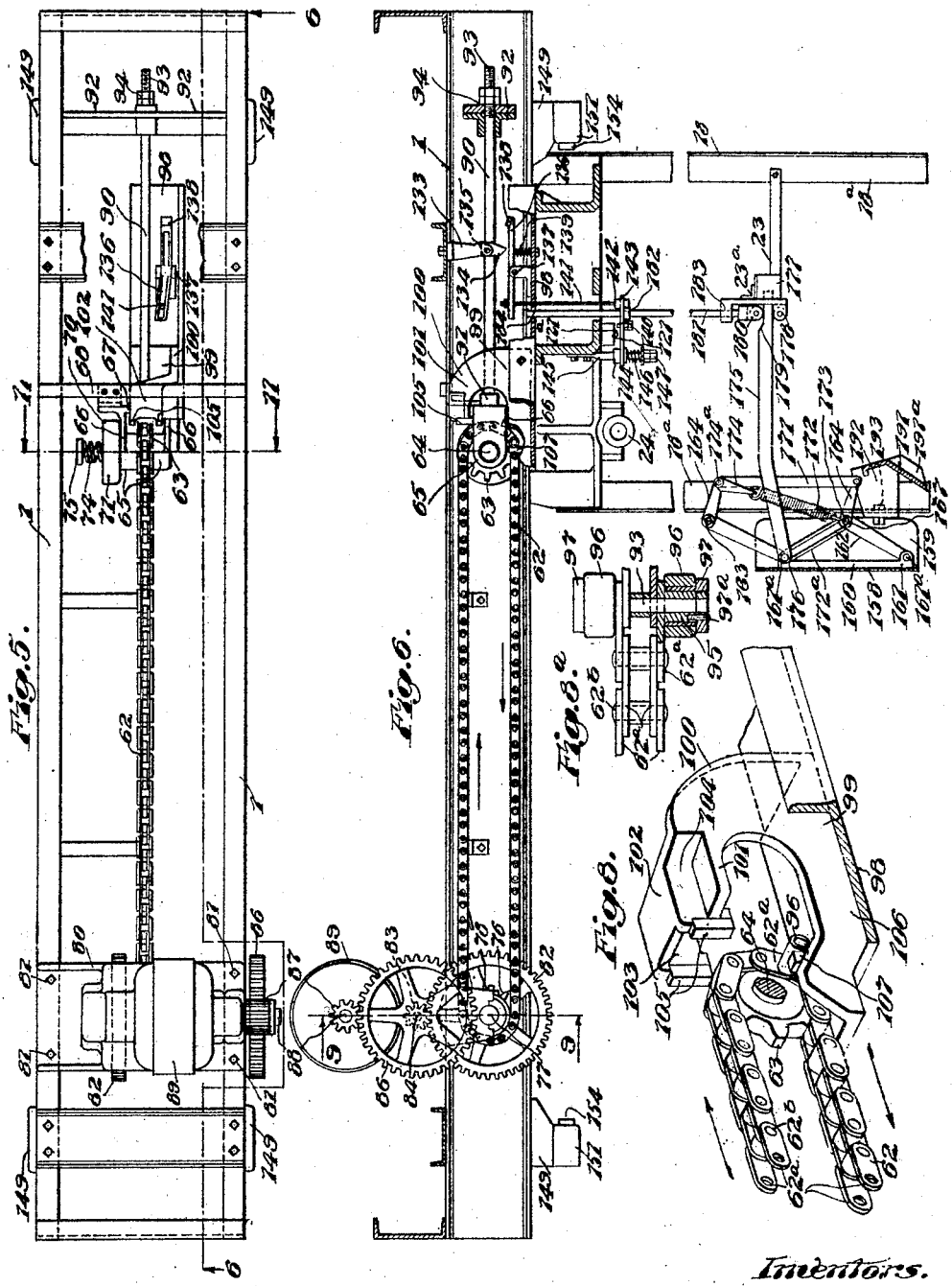
Inventors.
Riley L. Redpath
Sherwood C. Bliss.
by Ch. Heylmun
Atty.

April 28, 1925.
R. L. REDPATH ET AL
1,536,031
MOLD RAMMING MACHINE
Filed July 6, 1922    6 Sheets-Sheet 4
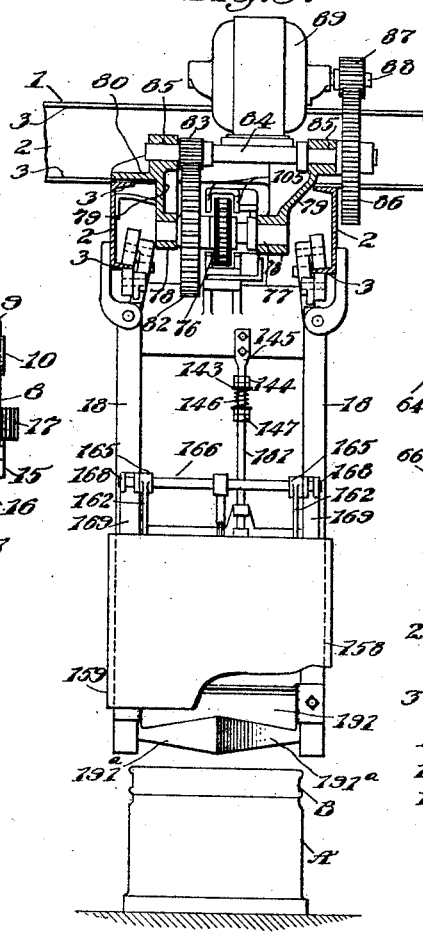
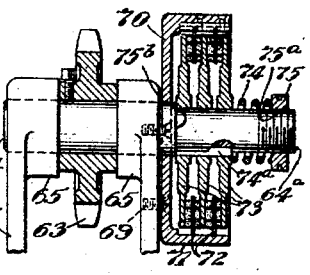
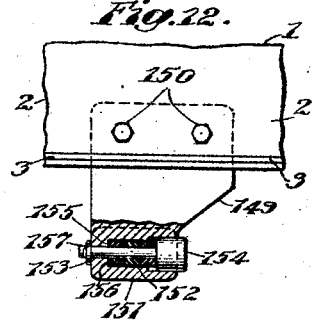
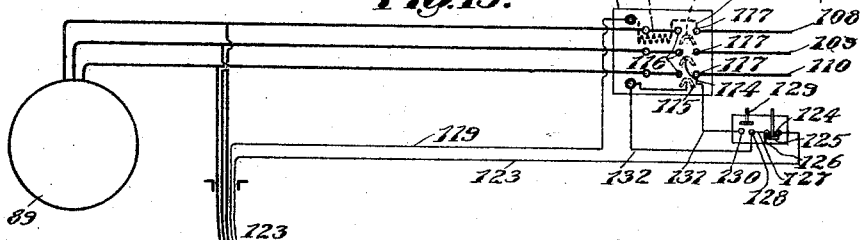
Inventors.
Riley L. Redpath
Sherwood C. Bliss

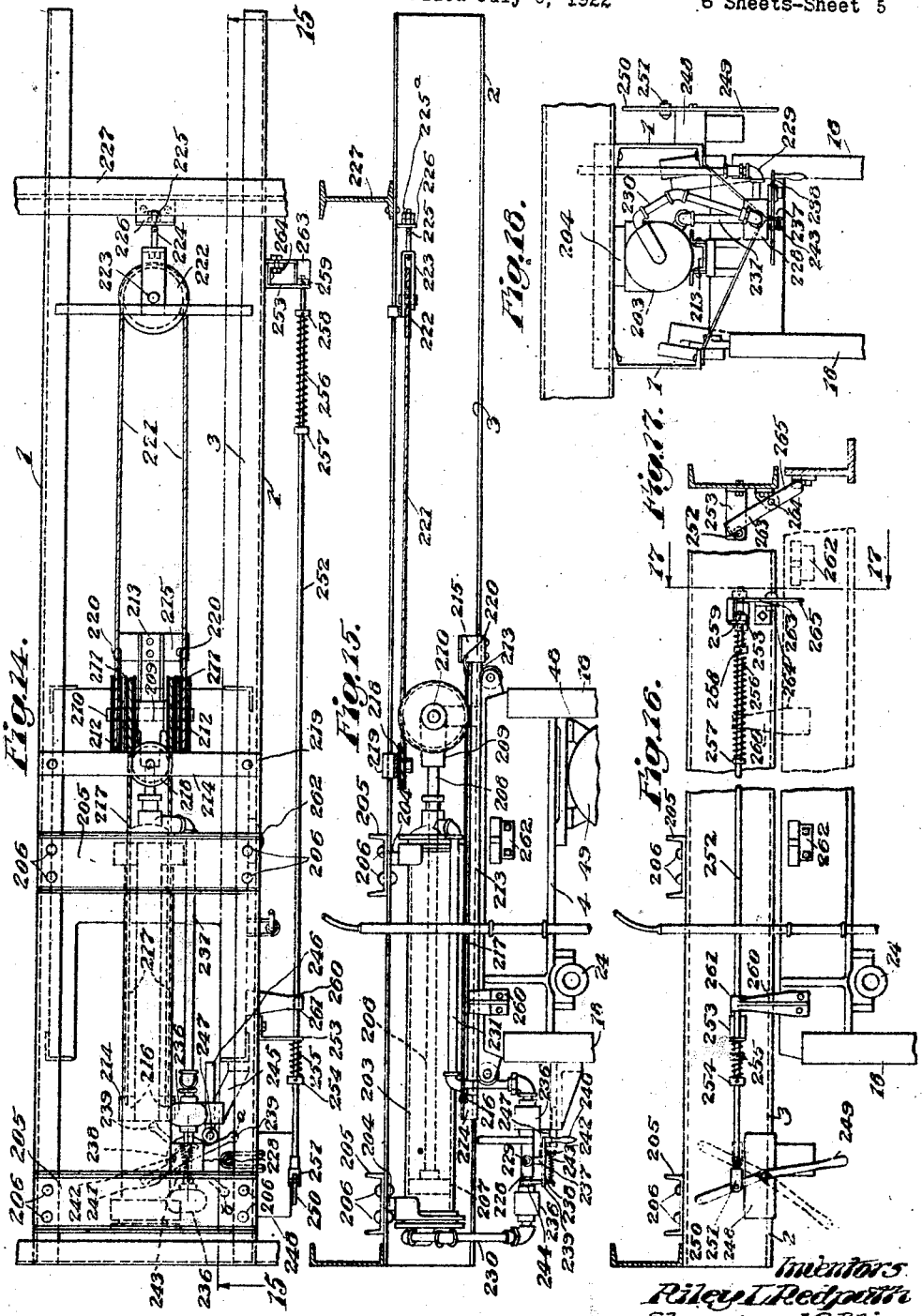

April 28, 1925.
R. L. REDPATH ET AL
1,536,031
MOLD RAMMING MACHINE
Filed July 6, 1922   6 Sheets-Sheet 6
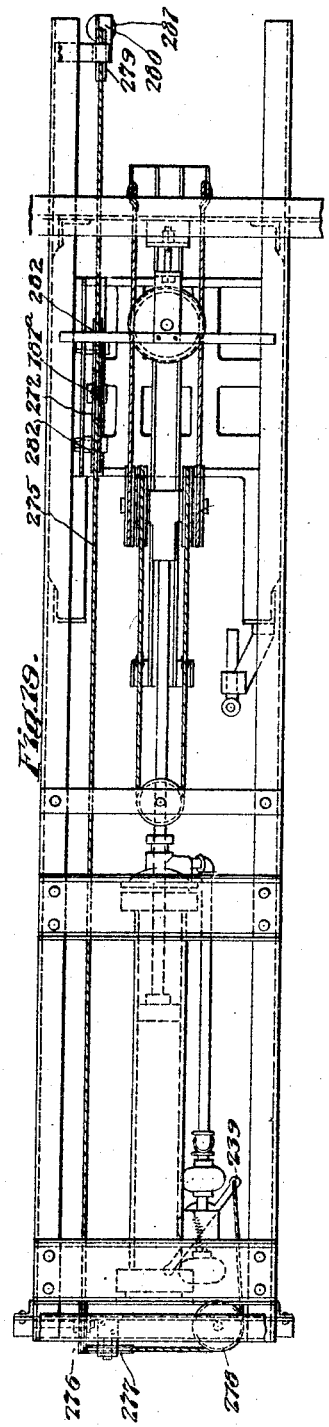
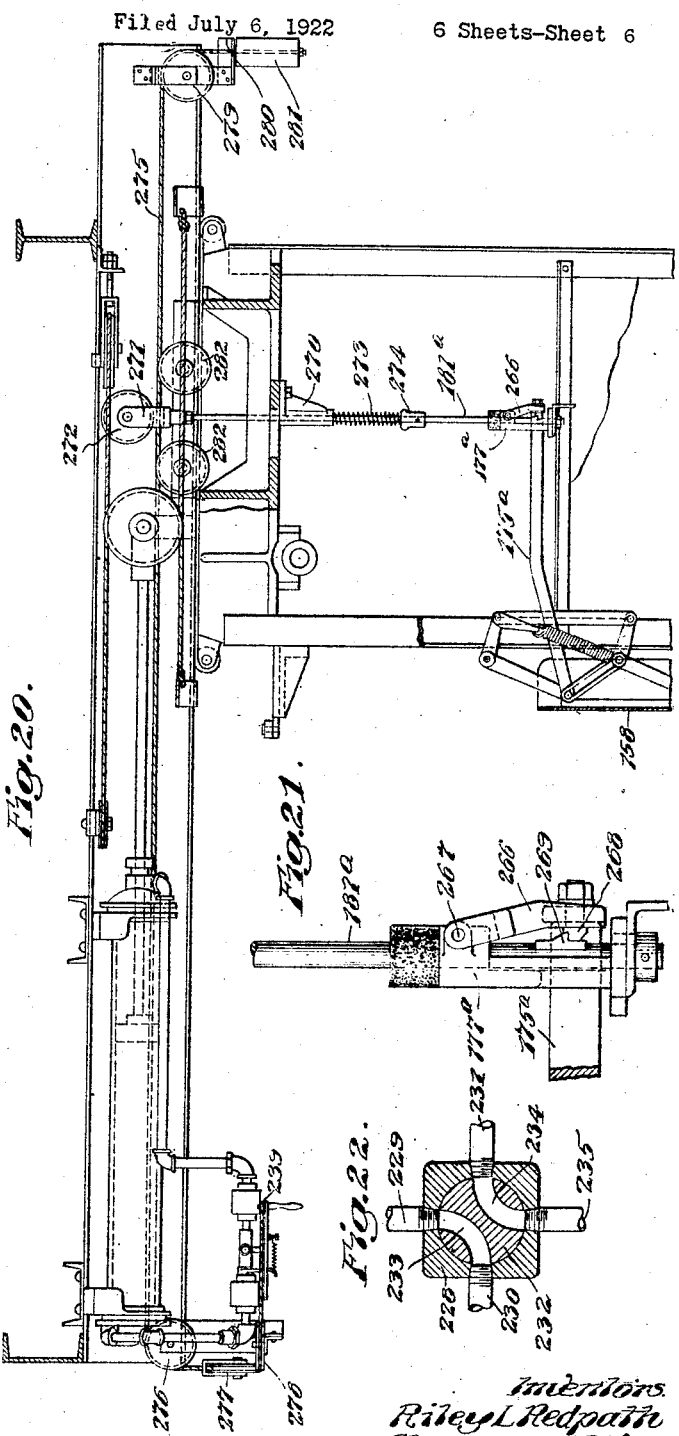

Patented Apr. 28, 1925.

1,536,031

UNITED STATES PATENT OFFICE.

RILEY L. REDPATH, OF BUFFALO, AND SHERWOOD C. BLISS, OF KENMORE, NEW YORK, ASSIGNORS TO AMERICAN RADIATOR COMPANY, OF NEW YORK, N. Y., A CORPORATION OF NEW JERSEY.

MOLD-RAMMING MACHINE.

Application filed July 6, 1922. Serial No. 573,140.

*To all whom it may concern:*

Be it known that we, RILEY L. REDPATH and SHERWOOD C. BLISS, both citizens of the United States, residing, respectively, at Buffalo, in the county of Erie and State of New York, and Kenmore, in the county of Erie and State of New York, have invented new and useful Improvements in Mold-Ramming Machines, of which the following is a full, clear, and exact specification.

Our invention relates to new and useful improvements in mold-ramming machines, and has for its primary object, among others which will fully appear hereinafter, to provide an improved and highly efficient machine for properly ramming molding sand, or equivalent material, in a flask or mold, so that such material will properly conform to such pattern or form as may be employed to determine the shape or configuration of the product to be cast or molded in the mold.

A further and important object is to provide an improved machine for the purpose mentioned, which will be supported on a suitable trackway, and suitably propelled to travel across the face of a mold, and in which the ramming element or elements will be actuated to perform the ramming operation during such travel.

A further object is to provide efficient means for controlling the propulsion of the machine, and the operation of the ramming element or elements.

A further object is to provide an efficient safety control means for stopping travel of the ramming machine relative to the mold, should an obstruction become interposed between said machine and mold during such travel.

Another object is to provide means whereby the molding sand, or its equivalent, will be packed or rammed so as to have the desired density.

The invention consists in the construction and combination of parts to be more fully described hereinafter, and the novelty of which will be particularly pointed out and distinctly claimed.

We have fully and clearly illustrated our invention in the accompanying drawings to be taken as a part of these specifications and wherein—

Figure 1 is a view in side elevation of a preferred embodiment of our invention, certain parts being broken away for the sake of clearness;

Fig. 2 is a top plan view of the structure shown in Fig. 1;

Fig. 3 is a front elevation, partly in section, and with certain parts broken away, of the structure shown in Figs. 1 and 2;

Fig. 4 is a section on the line 4—4 of Fig. 1;

Fig. 5 is a plan view of a trackway and propelling means for a carriage which supports and carries the ramming means;

Fig. 6 is a view in side elevation, partly in section, and with parts broken away, on the line 6—6 of Fig. 5;

Fig. 7 is a detail sectional view on the line 7—7 of Fig. 1;

Fig. 8 is a detail perspective view of certain elements of the driving means for the carriage;

Fig. 8$^a$ is a detail partly in section of a portion of a drive chain constituting one of the elements of our invention;

Fig. 9 is a section on the line 9—9 of Fig. 6;

Fig. 10 is a detail sectional view of a further form of running bracket for suspending the rammer carriage from an overhead trackway;

Fig. 11 is a detail sectional view on the line 11—11 of Fig. 5;

Fig. 12 is a detail view, partly in section, of a carriage buffer or stop;

Fig. 13 is a diagrammatic view of the controlling circuits for the motors shown in the preferred embodiment of our invention;

Fig. 14 is a top plan view of another embodiment of our invention in so far as relates to the propelling means for the rammer carriage, and the control for the rammer motor;

Fig. 15 is a longitudinal sectional view on the line 15—15 of Fig. 14, a portion only of the rammer carriage being shown;

Fig. 16 is a view in side elevation of the outside of the structure shown in Fig. 14, and showing the control for the rammer-driving motor;

Fig. 17 is a detail sectional view on the line 17—17 of Fig. 16 and

Fig. 18 is a view in end elevation of the structure shown in Figs. 14, 15 and 16, looking from the left.

Fig. 19 is a top plan view of the safety stop control applied to the form of the invention shown in Figs. 14 to 18 inclusive.

Fig. 20 is a side elevation of the structure shown in Fig. 19.

Fig. 21 is a detail view of a latch forming part of the safety control.

Fig. 22 is a detail in section of a control valve which may be employed in Figs. 14 to 21 inclusive.

Referring to the drawings by characters of reference, A designates a pattern support of any suitable type adapted to support upon its upper portion a pattern (not shown), and a mold or flask B adapted to receive molding sand or its equivalent which is adapted to conform to the pattern.

1, 1 designate the longitudinal members of a suitable trackway adapted to support a carriage upon which the ramming element or elements are mounted, and along which trackway said carriage is adapted to travel in order to cause the ramming means to traverse the mold containing the molding sand which is to be rammed. The members 1, 1 composing this trackway may take a number of forms within the spirit of our invention, but preferably are in the form of channel irons or beams supported rigidly in any suitable manner on columns or overhead girders (not shown) with their central or intermediate webs 2 in parallel vertical planes, and with their lateral or edge flanges 3 preferably directed inwards, as clearly shown in Fig. 3, the lowermost flanges serving as trackways for suspension brackets or hangers on the rammer carriage, as will be presently set forth.

The rammer carriage preferably comprises an upper frame-member which, in general structure, is rectangular in plan view (see Fig. 2), including longitudinal side members 4, 4, the same being connected, braced and stiffened by transverse members 5, 5 and web members 6, the latter lying in a horizontal plane. It will be seen that the longitudinal side members 4, 4 project beyond the web members 6 at both ends of the carriage. At its opposite ends and at each side thereof the frame-member is provided with a hanger or bracket 7 mounted on the said extensions of the side members 4, and having an upwardly extending arm 8 provided with an outwardly directed boss 9, in which is fixed a bearing or journal pin 10. The bearing pin 10 in each instance projects over the lower track flange 3 and carries a bearing or running roller 11 adapted to rest and travel on said flange 3. These brackets or hangers and running rollers just described support the rammer carriage from the trackway, and permit it to travel along the same. In order to provide for smooth travel of the carriage on its trackway, we also provide each of the brackets 7 with an arm 12 carrying a horizontally extending bearing pin 13, upon which is journalled a guiding and holding roller 14 arranged to travel on the under side of the flange 3, these rollers 14 serving to hold the rollers 11 in proper running engagement with the trackway during traverse movement of the carriage and during the ramming operation. It will also be seen that the rollers 14 also serve to prevent endwise tilting of the carriage. We also prefer to provide each bracket 7 on the opposite side of the roller 11 from the roller 14 with a lateral boss 15, in which is fixed a vertical bearing pin or journal 16, upon which is rotatably mounted a guide-roller 17 adapted to travel in rolling contact with the edge of the track flange 3. These rollers 17 serve to prevent any lateral shifting of the carriage during its travel, and assure it travelling in a straight path between the trackways.

In Fig. 10 we have shown another form of trackway in which the channel irons 1 are arranged with their integral flanges 3 directed outwards, and a removable and replaceable track member is provided, consisting of an angle-iron 3ª, one member 3ᵇ of which is arranged vertically and secured by bolts 3ᶜ to the inner side of the channel iron 1, and the other member 3ᵈ of which is directed horizontally to constitute the bearing element of the supporting trackway. In this form of the invention we may omit, if desired, the guiding and holding roller 14 heretofore described, and employ only the main supporting roller 11 and the guide-roller 17.

Rigidly connected to the upper frame-member are depending vertical corner members 18, the same being connected at their upper ends by means of suitable bolts 19 (see Fig. 1) to said carriage frame-member, said corner members preferably, but not necessarily, consisting of angle-irons arranged with their flanges 18ª at right angles to each other. The corner members are connected by transverse end plate members 20, 21 bolted thereto, as at 22, and also by longitudinally extending side members 23, whereby a strong and rigid structure is provided.

We will now proceed to describe a preferred embodiment of the ramming means, which is supported by and moves with the carriage described above:

On the lower forward portion of the longitudinal side members 4, 4 of the carriage frame are provided alining bearing boxes 24, in which is arranged a horizontal shaft 25 extending transversely of the carriage, said shaft carrying pairs of eccentrics 26, 27 extending in opposite directions laterally from the axis of the shaft, each eccentric carrying an eccentric ring or strap 28 to which is rigidly connected a depending connecting rod 29, there being two pairs of such rods in the present embodiment, although it will be understood that but one pair could be employed if desired. The lower ends of each pair of connecting rods are connected by a cross-shaft 30, from which is suspended the ramming element or elements adapted to be actuated by the eccentrics mentioned. The ramming element preferably comprises a carrier, including a transverse frame-member 31 provided with hanger sleeves or bearings 32 hung from the shaft 30, said frame-member also including vertical spaced sleeve-members 33, in each of which is slidably arranged a shank or plunger bar 34 carrying on its lower end a flange member 35 to which is secured a ramming foot 35ª. If desired the rear set of feet 35ª may be provided with projections 35ᵇ to operate to peen the sand along the walls of the flask. The plunger bar 34 is preferably tubular, as at 34ª (see Fig. 4), and receives a compression spring 36 abutting the upper end of the sleeve-member 33 and the ramming foot (see Fig. 4), to cushion the latter and also urge it toward ramming position. The outward movement of the ramming foot under influence of the spring 36 is limited by stud bolts 37 threaded into the foot, as at 38, and extending through openings 39 in ears 40 on the sleeve-member 33, the upper ends of said bolts being provided on the upper sides of said ears with nuts 40ª and cooperating with said ears to limit movement of the foot outward, but permit inward movement against the spring 36. If desired, cushions, blocks or washers of rubber, or other suitable material, 41 may be arranged between the nuts 40ª and the ears 40. In the present embodiment, the frame-member 31 supports two sleeve-members 33 each supporting a rammer foot, the feet operated by each pair of eccentrics being arranged in alinement transversely of the machine so as to ram the molding sand over an extended area transversely of the mold. The feet of each pair, by reason of the springs 36, are independently movable relative to their support so that either may yield independently of the other when necessary.

In the present embodiment, it will be seen that two pairs of ramming feet are employed, one pair being arranged in advance of the other.

The two frame-members 31 are substantially the same in form and construction, the only difference being that in the case of the forward one, the hanger bosses 32 are mounted on the ends of the shaft 30 projecting laterally outside the connecting rods (see Fig. 3), while in the case of the rearward one, said bosses are mounted on the shaft 30 at points between the connecting rods, see to the right-hand of Fig. 3, and in Fig. 4.

We will now describe a preferred means for guiding the lower ends of the connecting rods during reciprocation so as to assure the ramming feet operating in proper alinement: This means, as regards the forward ramming feet, consists of a pair of links 42, 42, one end of each link being pivotally connected to one of the forward pair of connecting rods, at a point closely adjacent the lower end thereof and preferably is pivotally mounted, as at 43, on the end of the pivot shaft 30 projecting outside the sleeves 33, the opposite ends of said links being pivoted, as at 44, on a horizontal bar 45 supported suitably by the rear corner members 18. In the case of the rearward connecting rods, a single guide link 46 may be employed, the same having one end pivoted, as at 47, on the shaft 30 at a point between the connecting rods 29, and the other end pivoted on the said bar 45. The links 42, and 46 are rigid members, and are of such length that the lower ends of the pairs of connecting rods are guided in different vertical paths respectively during reciprocation.

The eccentrics 26, 27 may be rotated by any suitable means in order to reciprocate the connecting rods 29 to impart the desired up and down movement to the rammer feet, but we prefer to employ the following described means: Depending from the upper frame-member heretofore described, is a hanger 48, of any suitable construction, supporting an electric motor 49 of any well known form and of the required power. On the armature shaft 50 of this motor is a sprocket 51 (see Fig. 1) which is connected by a sprocket chain 52 to a larger sprocket 53 mounted on the shaft 25, whereby the eccentrics are revolved to reciprocate the connecting rods, and the rammer feet carried thereby. We will later describe the manner of controlling this motor.

The carriage with the rammers is adapted to be propelled, by means to be presently described, to pass with a continuous movement across the face of a mold, and during this movement the rammers are continuously driven. It will be seen that if the rammers are continuously operated during the period of travel of the carriage, there will be times during which one or the other of the rammers will be in its lower position in contact with the molding sand, which would mean that the carriage would drag the lowermost rammer through the sand, thereby disturbing and pushing the sand ahead of it. In order to prevent this result, we provide improved means whereby the rammer foot while in its lower position in contact with the sand, will not be moved forward with the carriage, but will leave the sand by a substantially vertical movement from the lowermost point reached in ramming the sand. We accomplish the result stated by providing improved means whereby, during the travel of the carriage, the rammer foot when driven downwards to ram the sand will be permitted to remain in its initial place of contact until its connecting rod operates to lift it from the sand. This means comprises pairs of extensible yielding links, each of which is preferably in the form of a rod 54 having one end pivoted, as at 55, to one side of the rammer frame 31, the opposite end portion of each of said rods being slidably arranged in guide openings in bosses 56 on a swinging bracket 57 having one end pivoted on a transverse rod 56$^a$ rigidly mounted on the carriage frame, as at 58. Rigid with each rod 54 between the bosses 56 is a stop-collar 59, on opposite sides of which, and between the same and said bosses, are arranged coiled springs 60, 61 respectively. The arrangement and construction is such, that when the carriage is travelling forwards, i. e., toward the left of Fig. 1, and one of the rammer feet is in contact with the sand, such foot will not be moved forward with the carriage while in such contact, but will be allowed to maintain its position relative to the mold, the lower end of the connecting rod swinging forward on the shaft 30, and the rod 54 sliding rearwards through the bosses 56 and compressing the spring 61. As soon as the eccentric has moved far enough to lift the rammer foot clear of the sand, the spring 61 will expand and swing the foot forward into position to be moved downwards again to ram the sand. It will be seen that the extensible links 54 described provide the necessary relative movement between the carriage and the rammers which will permit the latter to remain stationary in contact momentarily with the sand without being dragged through the sand until the eccentric lifts the rammers in a substantially vertical direction out of the sand. When the carriage travels rearward, i. e., toward the right of Fig. 1, the carriage pulls the boss 56 against the spring 60 compressing the same against the collar 59, the rammer foot remaining stationary in contact with the sand. When the eccentric lifts the foot, the spring 60 exerts its force against the collar 59 to pull the foot into position to again be moved downward by the eccentric, the operation being the reverse of that described as taking place when the carriage is travelling forward.

We will now describe a preferred form of means for propelling the carriage across the face of a mold in order that the ramming means may ram the sand therein: This propelling means comprises an endless sprocket chain 62 (Figs. 5, 6, and 8), the runs of which are arranged to travel in a vertical plane, said chain preferably being arranged in the space between the track members 1, 1, heretofore described. At one end this sprocket chain is arranged to travel over a sprocket wheel 63 fixed to a horizontal shaft 64 mounted in bearings 65 in the arms 66 of a bracket 67, rigidly mounted on a cross member 68 supported slidably by the trackway structure (see Figs. 5, 6 and 11). Secured to the bracket 67 by means of screws 69 is an annular brake member 70, having a lateral circumferential flange 71 (Fig. 11) provided with a plurality of spaced, annular, fixed braking elements 72, with which are interspersed friction disks 73 slidably keyed, as at 74$^a$, on the projecting end 64$^a$ of the shaft 64, said elements and disks being maintained in engagement by a compression spring 74 arranged between the outermost disk 73 and a collar 75 threaded adjustably, as at 75$^a$, onto the outer end of said shaft. The spring 74 normally urges the disks 73 lengthwise of the shaft toward and into abutment with a shoulder 75$^b$ on the shaft 64. This brake acts continuously on the sprocket 63 to stop the travel on the chain promptly when current to the propelling motor is cut off. The opposite end of the chain from that just described travels over a sprocket wheel 76 (Figs. 6 and 9), fixed on a shaft 77 which is journalled at its ends in bearings 78 supported by brackets 79 on a casting 80, the ends of which are supported on and secured rigidly to the track members 1, 1 by bolts 81 (Fig. 5). The shaft 77 carries a gear 82, which meshes with a pinion 83 on a counter-shaft 84 in bearings 85 on said casting 80, said shaft 84 carrying a gear 86 meshing with a driving pinion 87 on the armature shaft 88 of a suitable electric motor 89, supported by said casting. When said motor 89 is energized, it operates to drive the chain 62 in the direction indicated by the arrows in Figs. 6 and 8. In order to provide for proper travel and compensate for wear or stretch of the chain, we provide a take-up, comprising a rod 90 threaded at one end into a boss 91 on the bracket 67, the opposite end of said rod passing through an opening in a member 92 fixed to the trackway, said rod being threaded, as at 93, and carrying jam-nuts 94 which cooperate with the member 92 to take up or let out the chain 62, as may be desired. The motor is driven in one direction and therefore causes each run of the chain 62 to travel continuously in the same direction.

We will now describe means for connecting the chain to the carriage so that the latter will be propelled to cause the ramming element or elements to ram the sand in the mold: This is accomplished in the preferred embodiment by connecting the carriage first to one run of the chain and then the other, so that the carriage will be reciprocated, the carriage being connected to the lower run of the chain in order to be moved toward and over the mold, and being then disconnected from the lower run and connected to the upper run to have its travel reversed, whereby the carriage is moved over the mold and away therefrom. The chain may be of the well known overlapping plate type in which the plates 62$^a$ are connected by transverse pins 62$^b$, and this chain is provided with a suitable connecting means by which connection is made with the carriage, this connecting means comprising lateral projections provided by forming one pair of opposite outside links 62$^a$ with bosses 95, upon which turn bearing rollers 96 held in place by nuts 97 threaded on bosses 95 and locked by screws 97$^a$. The bosses are preferably arranged on the outside link so as to surround a transverse pin 93, but it will be seen that such pin is relieved of bending strain because of pressure against the rollers, because the bosses are rigid with the link plates and therefore take up the entire bending strain.

On the carriage is arranged a flanged supporting plate 98 upon which is supported a bracket member 99 bolted rigidly to said plate so as to be immovably fixed to the carriage. The bracket member 99 is provided with a vertically extending member 100 arranged in a plane to one side of the plane of travel of the chain, and having an overhanging forwardly projecting arm 101 which in turn is provided with a lateral arm or projection 102 extending transversely of the direction of travel of the chain and above the upper run of the latter. The arm 102 is provided with vertical parallel spaced webs 103, 104 spaced from each other to provide a space through which the upper run of the chain passes. The forward portions of the webs 103, 104 are provided with abutment or engagement faces 105 adapted to be engaged by the rollers 96 on the chain 62 when the carriage is to be propelled in one direction, in a manner to be presently described.

The lower portion of the member 99 is extended, as at 106, beyond the forward end of the arm 102 and the faces 105 thereon, and is provided with abutment elements 107 on opposite sides of the lower run of the chain 62, said elements 107 being arranged to be engaged by the rollers 96 when the carriage is to be propelled in the forward direction. Assuming that the carriage is in the retracted position of rest, as shown in Figs. 5 and 6, the chain 62 being driven in the direction indicated by the arrows in Figs. 6 and 8, the rollers 96 engage the rear faces of the projections 107, and the chain moves the carriage forward towards and over the mold. When the carriage reaches the end of its forward movement, the rollers 96 move out of engagement with the projections 107 and pass over the sprocket 76 and engage the faces 105 on the carriage, and thereby drive the carriage in the reverse direction, i. e., toward its initial or starting position.

We will now describe a preferred means for controlling operation of the carriage-driving motor 89, and the rammer-operating motor 49, so that the rammers will be driven when the carriage is being propelled or reciprocated, and preferably whereby both motors are automatically stopped when the carriage reaches its initial or starting position. Referring particularly to Fig. 13 of the drawings, the carriage motor is indicated at 89 and the rammer-operating motor at 49. These motors, in the present embodiment, may be as shown, of the three-phase alternating current type of any suitable construction, the current supply conductors being shown at 108, 109, 110, both motors being on the same circuit so that they may be driven simultaneously. This motor circuit is suitably controlled preferably so that the operator closes the same to start the motors, and the circuit to both motors is discontinued automatically after the ramming operation has been completed. For this purpose there is interposed in the circuit, including the leads 108, 109, 110, a magnetically operated switch of any well known form for making and breaking the circuit through said leads. This switch is indicated generally at 111, and includes a magnet 112 which simultaneously operates three bridge-pieces or blades 113, 114, 115 to close the circuit through said leads, by bridging the contacts 116, 117 in each of said leads. The magnet 112 is connected on one side by a conductor 118 to the contact 117 in the lead 108, and on the other side by a conductor 119 to a contact 120 in a normally closed push-button switch 121, the other contact 122 of which is connected by a conductor 123 with a contact 124 of a normally closed push-button switch 125, the other contact 126 of which is connected by a conductor 127 with one contact 128, in a normally open push-button switch 129, the other contact 130 of which is connected by a conductor 131 to the contact 117 in the lead 110. The push-button switch 129 is the starting switch for throwing current on the motors, and when operated to closed position the circuit is from lead 110 through contact 117, conductor 131, switch 129, conductor 127, normally closed switch 124, switch 121, conductor 119, magnet 112, contact 117 to lead 108. When the magnet or solenoid 112 is energized, the blades or bridge-pieces 113, 114, 115 connect the contacts 116, 117 and the motors are then supplied with current whereby the carriage is propelled forward and the rammers reciprocated during such travel. During this operation of the carriage and rammers, the circuit through the magnet 112 is maintained by a branch conductor 132 connected to the lower bridge-piece 115 and with the contact 128 of the switch 129, which is in turn connected by the conductor 127 to contact 126 of the normally closed switch 125. If at any time during the travel of the carriage it should be desired to stop the carriage and rammers, this may be accomplished by manually opening the normally closed switch 125, whereupon the circuit through magnet 112 will be broken and the blades 113, 114 and 115 break the connections in the leads 108, 109, 110 and cut off current to the motors 89, 49. When the current to the motors is established the carriage moves forward to carry the rammers over the mold to ram the sand, which movement continues until the travel of the carriage is automatically reversed by the rollers 96 moving out of engagement with the projections 107 and into engagement with the faces 105, so that the carriage is moved toward its starting point.

Mechanism is provided for automatically stopping the carriage and the rammers when the carriage reaches its initial position at the end of its reverse travel, which mechanism will now be described: The push-button switch 121, which is normally closed, as heretofore mentioned, is mounted on the carriage and therefore travels with the same, and the automatic stopping of the carriage and rammers is accomplished by opening this switch when the carriage reaches its starting position. In order to open this switch, we mount on the trackway a bracket 133, upon which is pivotally mounted a tappet 134 which may swing freely on its pivot in the forward direction of travel of the carriage, but is provided with a shoulder 135 which normally engages the bracket 133, whereby the tappet is prevented from swinging in the reverse direction. Mounted on the carriage is an intermediately fulcrumed lever 136, the fulcrum being at 137, said lever being provided at its rear end with an inclined engaging face 138 held normally in the path of the tappet 134 by means of a suitable spring 139, so that when the carriage is moved rearward, said face 138 will engage the rigid tappet and the lever will be depressed. The opposite end of the lever from that having the face 138 is connected to one end of a pull-rod 141, the opposite end of which is connected, as at 142, to one end of a plate 143, arranged beneath the push-button 121$^a$ of the switch 121, the opposite end of said plate being provided with a hole through which passes a guide rod 145, said plate abutting against a fixed collar 144 mounted on the guide rod 145 which is rigidly attached to one of the frame members 5. The plate 143 rests upon a cushion spring 146 arranged between said plate and adjusting nuts 147 threaded on the said rod 145. When the carriage reaches the end of its rearward travel, the engaging face 138 on lever 136 strikes the tappet 134, whereby the end of the lever carrying said face is depressed, raising the other end of said lever and exerting a pull on rod 141 which lifts the plate 143 into engagement with the push-button 121$^a$ of the switch and operates the latter to break the current to the magnetic switch and consequently cutting off the current to the motors. We preferably provide the plate 143 with a suitable stop 148, which is adapted to strike the push-button casing to limit movement of the plate toward the push-button. The spring 146 cushions the application of force by the plate 143, should the stop strike the casing as said stop acts as a fulcrum for said plate, and the plate moves downward against and is cushioned by the spring 146. As soon as the face 138 has passed the tappet 134, the lever 136 is returned by the spring 139 to normal position and the push button automatically closes, but this will not energize the motors as current will not be again applied until the starting push-button 129 is closed manually to energize the magnet or solenoid 112 to close the motor circuits.

The operation of our invention, as so far described, is as follows: The carriage being at rest at its starting point, and the ramming elements also being at rest, the molders prepare the sand in the mold B supported on the pattern stand A, the sand being properly distributed about and over the pattern. The sand being prepared, the attendant then closes the push-button switch 129, which, in the manner heretofore described, throws current onto the magnetic switch 112 closing the latter, whereby the current-supply leads throw current onto the motors 49 and 89. The motors being energized the carriage is propelled toward and over the mold, and during the propulsion the ramming elements are driven to ram the sand. The carriage having reached the end of its forward travel, the rollers 96 ride out of engagement with the projections 107 and into engagement with the faces 105, whereby the direction of travel of the carriage is reversed and the carriage is returned toward its starting point. When the carriage has travelled in the reverse direction to approximately the starting point, the face 138 on lever 136 strikes the tappet 134 so that the lever 136 is operated to momentarily open the switch 121, and thereby open the switch 111 to stop both motors, the carriage and the rammers being brought to rest.

The travel of the carriage in both directions may be limited by stops mounted on the trackway in the path of movement of the carriage and adapted to be struck by the latter. Each of these stops comprises a bracket arm 149 bolted, as at 150, to the beam 1, and having at its lower portion a boss 151 having a bore 152 in which is arranged slidably a plunger-pin 153 carrying a buffer-head 154 adapted to be engaged by the carriage, the sliding movement of the buffer-head in one direction being cushioned by rubber blocks 155 arranged in said bore 152 between the head 154 and a shoulder 156 in said bore. The movement of the plunger-head in the opposite direction is limited by a stop washer 157 on the end of the pin 153 projecting beyond the rear of the boss 151. Preferably four of the stops described are employed, supported in pairs at the opposite limits of travel of the carriage.

Our invention also contemplates the provision of an automatic safety stop, whereby the travel of the carriage and the reciprocation of the rammers are stopped in the event an obstruction, for example, a workman, should get in the path of movement of the carriage toward the mold to be rammed. This means comprises a movably supported buffer-member, preferably in the form of a vertically disposed plate 158, having side guard members in the form of flanges 159. The plate 158 carries on its rear face a pair of vertical parallel supporting bars 160, each of which is provided with upper and lower pairs of apertured ears 161 carrying transverse pivot bars 161ª. To each of said bars is pivoted the lower end of one arm 162 of a bell-crank lever 163, each of which has a rearwardly and downwardly projecting arm 164.

The bell-crank levers are arranged in pairs at the top and bottom of said plate 158, and are fulcrumed, as at 165, on upper and lower transverse bars 166, 167, mounted at their ends in bearing ears 168 on the upper and lower ends of vertical bars or straps 169, bolted, as at 170 (Fig. 3), to the side members 18 of the carriage. The upper and lower arms 164 at each side of the plate 158 are connected by links 171. The arrangement of the bell-crank levers and their connections with each other and with the plate 158 is such that said plate may be moved toward and away from the carriage, and during such movement will always be maintained in a parallel plane. The plate 158 is yieldingly urged to, and held in its position spaced from the carriage frame, preferably by means of a contractile spring 172, one end of which is anchored, as at 173, to the rod 167, and the other end of which is anchored to a link 174 hung on a bar 174ª connecting the rear ends of the arms 164 of the upper pair of bell-crank levers. The spring 172 exerts its force to pull down on the upper arms 164, thereby swinging the arms 162 outward to the position shown in Fig. 1 of the drawings. The outward movement of the plate 158 is limited by a slotted link 172ª, the slot of which receives the bar 167 and the upper pivot bar 161ª on said plate. It will be seen that should the plate 158 be engaged by an obstruction, said plate will be moved toward the carriage, and this movement we employ to actuate the switch 121 to stop the carriage and the rammers. For the purpose stated, we employ a thrust rod 175, one end of which is pivoted, as at 176, on the pivot bar 161ª, and the other end of which slidably engages a guide bracket 177 supported by a bar 23ª mounted on one of the frame-members 23, the lower face of said thrust rod moving on an anti-friction roller 178. The upper face of the thrust bar is provided with an inclined cam face 179 adapted to engage a roller 180 on the lower end of a vertical switch-operating rod 181 passing through an opening in the plate 143, said member 181 having fixed thereto a stop-collar 182 normally engaging the underside of said plate 143. The rod 181 is guided in an opening in a guide-bracket 183 on the bracket 177 and a guide opening 184 in plate 98 (see Fig. 6). The arrangement is such that the engagement of buffer-plate 158 with an obstruction, will move said plate to thrust bar 175 rearward to cause the cam face 179 to engage roller 180 to thrust the bar 181 upward to move the plate 143 to operate the push-button switch 121 to cut off current to switch 112, and consequently stop the motors 49 and 89. When the obstruction is removed, the motors may again be energized by manually closing the push-button switch 129.

At its forward end the carriage is provided with a transverse leveller or striker member preferably in the form of a plate 185 pivotally supported, as at 186, on a transverse bar 187 fixed on the upper ends 188 of brackets 189 carried by the front ends of the retainer plates 194 to be hereinafter described, said plate 185, if desired, having a serrated or notched lower edge, as at 185ª. The plate 185 normally rests upon stops 190 (Fig. 1) integral with the brackets 189, and so located that said plate is inclined in a direction downwards and rearwardly from its pivot relative to the forward direction of travel of the carriage. During forward movement of the carriage, the plate 185 because of its pivoted mounting, swings upwards and rides freely over the sand in the mold, but on the rearward movement of the carriage, said plate remains in its lowermost position, as shown in Fig. 1, and serves to level or strike the sand which has been rammed.

Behind the plate 185, is a sand distributing and levelling member, preferably in the form of a rigid plate 191, located in advance of the forward rammers and extending transversely of the carriage, said plate 191 being supported at its ends preferably by integral brackets 192 rigidly connected by bolts 193 to the front members 18 of the carriage. The plate 191 is formed with oppositely and rearwardly inclined members 191ª, and during forward movement of the carriage, operates as a plow or scraper to distribute the sand evenly from the center of the mold toward its side edges and to bring the sand to the desired level and thickness to be rammed by the rammers.

The carriage is provided at its lower side portions with retainer-plates 194, adapted to travel on or adjacent the side edges of the mold and prevent the sand being thrown outwards by the action of the rammers. Each of said plates is arranged and mounted so as to yieldingly rest on the mold, and for this purpose is provided on its outer face and at each end with upper and lower outwardly projecting guide-ears 195, 196, the said guide plate being supported by a headed bolt 197 passing through the flange on a frame member 23 and an opening in the ear 195, the head of the bolt resting on the flange of the bar 23, and the lower end of the bolt having a nut 198 threaded thereon and located beneath said ear. The ears 195 are slidable upon the bolts 197, so that the plate 194 will have vertical play to accommodate itself to the side edges of the mold, but the downward movement of the plate is limited by the nuts 198. The plate 194 is guided in its vertical movement and maintained in a substantially vertical plane by guide-pins 199 extending through an opening 202 in the flange on a frame bar 23, and supported on said flange, as by a cotter-pin 200, said pins 199 extending downward through openings 201 in said ears 195, 196, respectively, and opening 202ª in the lower frame member 23. The ears 195, 196 slide freely upon the said pins 199, whereby the retaining plate is guided vertically.

In Figs. 14 to 18, inclusive, we have shown another embodiment of our invention, which will now be described: 203 designates a horizontally arranged power cylinder arranged between the track-beams 1, preferably at the forward end of said trackway, said cylinder being suitably supported at its ends by hangers 204 depending from cross-girders 205, extending transversely of the trackway, and secured by rivets 206 to said side beams 1. Within the cylinder 203 is a piston 207, indicated in dotted lines in Fig. 15, carried by a rod 208 which projects through one cylinder head and carries on its outer end a bearing member 209 carrying a transverse journal or axle 210, upon which turn inner sheaves 211 and outer sheaves 212, one of each of said sheaves 211 and 212 being arranged on opposite sides of said bearing member. The arrangement is such that said sheaves are moved in either direction lengthwise of the trackway by means of the piston 207 in a manner to be presently described.

Mounted on the upper portion of the carriage and extending longitudinally thereof, is a member 213, the same being rigidly connected to the carriage and carrying at its ends transverse brackets 214, 215. Connected, as at 216, to the ends of the brackets 214 are the ends of parallel runs of a cable 217, which runs are carried around the inner sheaves 211 on the cylinder piston rod, the intermediate part of the said cable being looped about a fixed sheave 218 anchored to a transverse supporting member 219, the end of which are riveted to the track-members 1. The arrangement is such that when the piston of the power cylinder is moved toward the right of Figs. 14 and 15, the said sheaves 211 will exert a pull on the cable 217 to propel the carriage toward its starting point, it being understood that in these figures the carriage is shown at the end of its forward travel with the rammer elements located over the mold.

Connected, as at 220, to the ends of the bracket 215 are the opposite ends of a cable 221, which is doubled on itself, as shown, and the runs of which are carried around the outer sheaves 212, and the intermediate portion of which is looped about a sheave 222, journalled in a bearing-piece 223 carried by a take-up bolt 224 having a threaded end 225 passing through an opening in a fixed bracket 226 supported on a transverse girder 227, said bolt carrying adjusting nuts 225ª, co-operating with bracket 226 to adjust said bolt. When the cylinder piston is moved toward the left of Figs. 14 and 15, pull is exerted on the cable 221 to traverse the carriage to the position shown in said figures.

We will now describe means for supplying compressed air as a power medium to the cylinder 203 and for controlling such supply: 228 designates a supply or throttle valve of well-known construction, which is connected by a pipe 229 (Fig. 15) with any suitable source of compressed air. The casing of the valve 228 is connected by pipes 230, 231 with the opposite ends of the cylinder 203, said pipes constituting both supply and exhaust conduits. The valve 228 is of any suitable type, such, for example, as shown in Fig. 22, including a turn-plug 232 having ports 233, 234 adapted to connect the pipes 230, 231 alternately with either the supply 229 or an exhaust post 235. When the valve is rotated in one direction, air flows to one end of the cylinder to move the piston toward the opposite end, the air on the opposite side of the piston being exhausted through the valve casing. If desired, each of the pipes 230, 231 may have inserted therein speed control valves 236 for automatically governing the supply and exhaust of air from the cylinder so that the rate of travel of the piston is regulated independently of the throttle or control valve, which only determines the direction of travel of the piston. These speed control valves are of well-known construction and need not be further described in detail. The valve member 232 is provided with a stem 237, upon which is mounted a plate 238 carrying a hand-lever 239 having a hand-grasp 240, by means of which said valve may be manually operated to control the direction of travel of the carriage. Said plate 238 is provided with a segmental slot 241, in which is adjustably mounted a pin or bolt 242 which constitutes an anchorage for one end of a spring 243, the other end of which is anchored to a finger 244 rigidly mounted on the pipe 230. The spring anchorages 242, 244 are so located that the spring 243, during swinging movement of the lever 239 in either direction, may be moved to either side of the center of rotation of the valve, whereby the force of the spring will be exerted to quickly move the valve by a snap action to its extreme positions, and also hold it in such positions until moved intentionally.

The carriage being at its starting position, i. e., at the right-hand end of the trackway in Fig. 15, the operator moves the lever 239 to the position shown in full lines at $a$ in Fig. 14 and in Figs. 15 and 18, whereupon compressed air flows by way of the valve 228 and pipe 231 to the inner end of the cylinder, said air exerting its force upon the piston 207 to move it toward the position shown in dotted lines in Fig. 15. This motion of the piston draws the sheaves 211, 212 toward the cylinder and exerts a pull on the cable 221 to move the carriage to ramming position with relation to the mold, i. e., the position shown in Fig. 15.

On the front portion of the carriage is a bracket 245, carrying a longitudinally adjustable rod 246, having at one end a contact roller 247, which is adapted to contact the lever 239 as the carriage approximates the end of its forward travel. The continued movement of the carriage moves the lever 239 toward reverse position, and as soon as the spring anchorage 242 is moved beyond the center of rotation of the valve, said spring 243 exerts its force to move the lever with a snap action to reverse position, as shown in dotted lines at $b$ in Fig. 14. When the lever 239 is moved to reverse position, the inner end of the cylinder 203 is connected to the exhaust 235 of the valve, and the pipe 230 is connected to the supply 229, so that compressed air is supplied to the outer end of the cylinder to move the piston 207 outwards relative to the cylinder. The outward movement of the piston moves the sheaves 211, 212 in the opposite direction from that previously described, thereby exerting a pull on the cable 217 to draw the carriage from its forward position or ramming position to its initial or starting position. When the piston reaches the outermost limit of its travel, the carriage is brought to rest, and the piston is held in this position under the air pressure until the throttle or controlling valve 228 is again manually operated to cause the piston to move in the forward direction to propel the carriage to bring the rammers over a mold.

In the alternate form just described, the ramming elements are driven by a motor in the same manner as in the form of the invention first described. The means for controlling the current to the motor 49 in this form will now be described: On the trackway structure is mounted a control switch 248 of any suitable construction and operable by a control lever 249, by which the switch may be opened and closed manually, if desired. Connected to an extension 250 of said lever, as at 251, is one end of a horizontally disposed control rod 252 which is supported by, and is longitudinally slidable through, brackets 253 connected to the beam 1, said rod being operable under control of the carriage to actuate the switch-lever 249 to control supply of current to the rammer carriage.

The rod 252 is provided with a fixed collar 254 between which and one of the brackets 253 is a compression spring 255, and also on the said rod is arranged a spring 256 between a collar 257 slidably mounted on said rod and a collar 258 fixed on the rod. The rear end of the rod projects through a bracket 253 and carries a fixed collar 259. On the carriage adjacent the forward portion thereof, and preferably fixed thereto, is an arm 260 having at its free end an apertured boss 261, which slides on the rod 252 during travel of the carriage, and mounted on the side of the carriage is a wedge member 262 for a purpose to be presently described. On the side of the trackway adjacent the rear end of the rod 252 is a latch 263 pivoted at a point intermediate its length on the trackway, as at 264, said latch having a locking head at its upper end adapted to take position in front of said collar 259 to hold the rod 252 to maintain the lever 249 in position to cut off current to the motor. The latch pivot is so located that the locking end or head automatically gravitates to the position to hold the rod 252, for the purpose stated. The latch is provided with a tail-piece 265 normally located in the path of the wedge 262 so as to be moved outward by the wedge to thereby move the head out of locking position relative to the latch.

When the carriage is moved to its retracted position, the boss 261 engages the slidable collar 257, compressing the spring 256 against the fixed collar 258 until the rod is moved rearwards a sufficient distance to pull the lever extension 250 to the position shown in dotted lines in Fig. 16 to open the switch and cut off current to the motor. During this rearward movement of the carriage, the locking head on the latch 263 bears on collar 259 until said collar is moved past the rear of the latch, whereupon the latter drops forward in front of the collar 259 and thereby holds the rod 252 in the position to which it has been moved by the arm 260. The switch will be held in open position so long as the carriage remains in retracted position. The rearward movement of the rod 252, as just described, serves to compress the spring 255 between the collar 254 and the adjacent bracket 253. Upon the operator throwing the valve lever 239 to cause the compressed air to flow to the cylinder, the carriage will start on its forward travel, the arm gradually relieving the compression on spring 256, and wedge 262 approaching the tail 265 of the latch lever. By the time the wedge 262 has reached the tailpiece 265 and moved the latch to release the rod 252, the boss 260 will have moved far enough to have entirely released the spring 256 so as to permit the less powerful spring 255 to exert its force to throw the rod 252 to move the switch 248 to closed position and thereby supply current to the rammer motor so that the rammers are set in motion and continue to operate during further forward and rearward travel of the carriage. When on its rearward travel the carriage has moved far enough to cause the boss 261 to sufficiently compress the spring 256 to slide the rod 252 to the rear, the switch will be opened and the current to the rammer motor cut off, and the rammers will come to rest. It will thus be seen that in both forms of the invention, the travel of the carriage is automatically reversed, and the means for driving the rammers is automatically stopped on the reverse movement of the carriage when the rammers have cleared the mold.

The embodiment of the invention shown in Fig. 14 to 22 inclusive is also provided with a safety-stop mechanism to operate to stop travel of the carriage in event an obstruction becomes interposed between the mold and the carriage during forward travel of the latter. This means comprises a buffer plate 158 which is the same construction and is mounted in the same manner as heretofore described, said plate being provided with a thrust bar 175ª similar to the bar 175. At its rear end the bar 175ª is slidable through a guide bracket 177ª supported in the same manner as bracket 177. The rear end of the bar 175ª abuts a latch 266 pivoted at 267 on a part of the bracket 177ª. This latch is provided with an engaging piece 268 which co-operates with an opposite and similar engaging piece 269 on a vertical rod 181ª guided at its lower end in bracket 177ª and at its upper end in a bracket 270 on the carriage. On the upper end of the rod 181ª and above the carriage, is a yoke 271, carrying a sheave 272. The rod 181ª carries a compression spring 273 acting between the bracket 270 and a stop-collar 274 fixed on the rod 181ª, said spring operating to thrust the rod 181ª downwards. Extending lengthwise of the trackway and beneath the sheave 272 is a pull-cable 275 one end of which is connected to the lever 239, said cable being guided by suitable sheaves 276, 277, 278. The opposite end of the cable passes over a sheave 279 at the opposite end of the trackway, and downwards through a stop bracket 280, said cable carrying a counter-weight 281 which maintains the cable taut. On the carriage are two guide sheaves 282, arranged beneath the cable 275 and on opposite sides of the rod 181ª. The arrangement is such that the rod may be manually adjusted to the position shown in Fig. 20 wherein it is held in such position by the latch 266. Should the buffer plate strike an obstruction, the bar 175ª, will be moved rearwards relative to the carriage whereby the latch 266 will be moved out of locking engagement with rod 181ª whereupon the spring 273 will thrust rod 181ª downwards causing the sheave 272 to engage the cable 275 and pull a bight therein over and between the sheaves 282, which results in said cable exerting a pull on the valve lever 239 to move the valve member of the controlling valve to reverse position to automatically reverse the flow of pressure fluid and retract the carriage. The bracket 280 serves as a stop for the weight 281, so that the cable is given the necessary operative tension to actuate the valve when the cable is pulled by the sheave 272.

What we claim and desire to secure by Letters Patent of the United States is:—

1. In a mold-ramming machine, a trackway, a carriage suspended by running wheels on the trackway, vertically reciprocable ramming members on the carriage, means whereby the carriage is reciprocated on the trackway, a motor on the carriage, a driving connection between the motor and said ramming members whereby the latter are reciprocated during both movements of reciprocation of the carriage, and means for stopping said carriage at the end of a reciprocation.

2. In a mold-ramming machine, a trackway, a carriage suspended by running wheels on said trackway, a transverse shaft on said carriage and having a plurality of cranks, vertically reciprocable members suspended from said cranks, ramming members pivoted to said members, means whereby said carriage is reciprocated on the trackway, a motor on the carriage and having a driving connection with said cranks whereby the vertically reciprocable members are reciprocated during both movements of reciprocation of the carriage, and means for stopping the carriage at the end of a reciprocation.

3. In a mold-ramming machine, a trackway, a carriage suspended by running wheels on the trackway, a transverse shaft on said carriage and having a plurality of cranks, vertically reciprocable members connected to said cranks, ramming members pivoted to said reciprocable members, means for reciprocating said carriage on the trackway, means for automatically reversing the carriage at the end of a forward movement of a reciprocation, a motor on said carriage, connections between said motor and said shaft whereby the latter is driven during both movements of a reciprocation of the carriage, and means for automatically stopping the carriage at the end of a reciprocation.

4. In a mold-ramming machine, a carriage, means for reciprocating the carriage across a mold, ramming means carried by the carriage, means for driving the ramming means during travel of the carriage across the mold, and means for automatically stopping the ramming means when the latter is clear of the mold.

5. In a mold-ramming machine, a carriage, means for reciprocating the carriage across a mold, ramming means carried by the carriage, means for driving the ramming means during travel of the carriage across the mold, and means for automatically stopping the ramming means at the end of a reciprocation of the carriage.

6. In a mold-ramming machine, a carriage adapted to be propelled over a mold, means for propelling the carriage, ramming means on the carriage, a motor for driving the ramming means, and controlling means for said motor whereby the latter is driven during the propulsion of the carriage.

7. In a mold-ramming machine, a carriage, means for reciprocating the carriage across a mold, vertically reciprocable ramming means on the carriage, means for reciprocating the ramming means during travel of the carriage across the mold, and means for automatically stopping the reciprocation of the ramming means at the end of a reciprocation of the carriage.

8. In a mold-ramming machine, a carriage, a trackway supporting the carriage, ramming means carried by the carriage, power means for driving the carriage to carry the ramming means across a mold, means for driving the ramming means, means for reversing the travel of the carriage, and means for stopping the carriage and the operation of the ramming means at the end of its reverse travel.

9. In a mold-ramming machine, a carriage adapted to be propelled over a mold, means for propelling the carriage, ramming means on the carriage, a motor for driving the ramming means, and means for simultaneously stopping and starting said propelling means and said driving means.

10. In a mold-ramming machine, a carriage adapted to be reciprocated over a mold, a motor for reciprocating the carriage, ramming means on the carriage, a motor for driving said ramming means, and means operable by reciprocation of the carriage for controlling said motors.

11. In a mold-ramming machine, a carriage, a motor for propelling the carriage, ramming means on the carriage, a motor for driving the ramming means, manually operable means for starting both said driving means, and means for automatically stopping both said driving means.

12. In a mold-ramming machine, a carriage, a motor for driving the carriage, ramming means on the carriage, a motor for driving the ramming means, manually operable means for starting both said motors simultaneously, and means for automatically and simultaneously stopping both said driving motors.

13. In a mold-ramming machine, a carriage, a motor for driving the carriage, ramming means on the carriage, a motor for driving the ramming means, manually operable means for controlling the motor for driving the carriage, and means for automatically controlling the motor for driving the ramming means.

14. In a mold-ramming machine, a carriage, a motor for driving the carriage, ramming means on the carriage, a motor for driving the ramming means, manually operable means for controlling the motor for driving the carriage, and means actuated by the carriage for automatically controlling the motor for driving the ramming means.

15. In a mold-ramming machine, a carriage, means for propelling the carriage, manually operable means for controlling said propelling means, ramming means on the carriage, means for driving the ramming means, and means whereby the operation of said manually operable means sets into operation the means for driving the ramming means.

16. In a mold-ramming machine, a carriage, means for reciprocating the carriage across a mold, ramming means carried by the carriage, manually operable control means for starting reciprocating of the carriage, means whereby the carriage operates said control means to reverse the travel of the carriage, means for actuating said ramming means during travel of the carriage across a mold, and means operable by the carriage on its reverse travel to stop said ramming means.

17. In a mold-ramming machine, a carriage, a trackway supporting the carriage, ramming means carried by the carriage, an endless member, means for driving said member in one direction, and means for reciprocating the carriage by said member.

18. In a mold-ramming machine, a carriage, a trackway supporting the carriage, ramming means carried by the carriage, an endless chain, means including a sprocket element for driving said chain in one direction, and means for reciprocating the carriage by said chain.

19. In a mold-ramming machine, a carriage, a trackway supporting the carriage, ramming means carried by the carriage, an endless travelling chain, means for driving said chain, and means for establishing a driving engagement between the carriage and opposite runs of the chain alternately.

20. In a mold-ramming machine, a carriage, a trackway supporting the carriage, ramming means carried by the carriage, an endless travelling chain, means for driving said chain, and means for establishing automatically a driving engagement between the carriage and opposite runs of the chain alternately.

21. In a mold-ramming machine, a carriage, a trackway supporting the carriage, ramming means carried by the carriage, an endless travelling chain, means for driving said chain, and engaging devices on the carriage for cooperating with opposite runs of the chain alternately whereby the carriage is reciprocated.

22. In a mold-ramming machine, a carriage, a trackway supporting the carriage, ramming means carried by the carriage, an endless travelling chain, and driving means comprising spaced abutments on the carriage for cooperating alternately with the opposite runs of the chain.

23. In a mold-ramming machine, a carriage, a trackway supporting the carriage, ramming means carried by the carriage, means for driving said carriage and comprising an endless chain travelling in a vertical plane, and upper and lower abutments on the carriage arranged to cooperate with the upper and lower runs of said chain whereby the carriage is reciprocated.

24. In a mold-ramming machine, a carriage, a trackway supporting the carriage, ramming means carried by the carriage, means for driving said carriage and comprising an endless chain, means for connecting the carriage with the opposite runs of the chain alternately to thereby reciprocate the carriage, power means to drive the chain, and means to stop the carriage at the end of a reciprocation.

25. In a mold-ramming machine, a carriage, a trackway supporting the carriage, ramming means carried by the carriage, means for driving said carriage and comprising an endless chain, power means to drive the chain, means for connecting the carriage with opposite runs of the chain alternately to thereby reciprocate the carriage, and means to discontinue the application of power and to stop travel of the carriage at the end of a reciprocation.

26. In a mold-ramming machine, a carriage, a trackway supporting the carriage, ramming means carried by the carriage, an endless chain, means for connecting the carriage with opposite runs of the chain alternately to thereby reciprocate the carriage, an electric motor for driving said chain, means for supplying current to the motor, and means for breaking said current at the end of a reciprocation of the carriage.

27. In a mold-ramming machine, a carriage, a trackway supporting the carriage, ramming means carried by the carriage, a travelling endless chain, means for reciprocating the carriage by said chain, an electric motor for driving said chain, means for supplying current to the motor, means for breaking said current at the end of a reciprocation of the carriage, and means for automatically breaking said current in the event of an obstruction occurring in the path of the carriage during its travel.

28. In a mold-ramming machine, a carriage, a trackway supporting the carriage, ramming means carried by the carriage, propelling means for the carriage, a controller for said propelling means, a buffer element on the carriage and movable relative thereto upon engagement with an obstruction, and means actuated by said buffer element for operating said controller.

29. In a mold-ramming machine, a carriage, a trackway supporting the carriage, ramming means on the carriage, propelling means for the carriage, a controller operable at a determined point in the travel of the carriage to stop the travel of the carriage, a buffer element on the carriage and movable relative thereto upon engagement with an obstruction, and means actuated by said buffer element for operating said controller to stop the carriage.

30. In a mold-ramming machine, a carriage, a trackway supporting the carriage, ramming means on the carriage, propelling means for the carriage, means for driving the ramming means, a controller operable at a determined point in the travel of the carriage to stop travel of the carriage and the operation of the ramming means, a buffer element on the carriage and movable relative thereto upon engagement with an obstruction, and means actuated by said buffer element for operating said controller to stop the carriage and said ramming means.

31. In a mold-ramming machine, a carriage, a trackway supporting the carriage, ramming means on the carriage, propelling means for the carriage, a controller for the propelling means and mounted on the carriage, means on the trackway and cooperating with the controller to operate the same to stop travel of the carriage at a predetermined point in its travel, a buffer element on the carriage for movement relative thereto upon engagement with an obstruction, and means actuated by said buffer element for operating said controller to stop the carriage.

32. In a mold-ramming machine, a carriage, a trackway supporting the carriage, ramming means on the carriage, propelling means for the carriage, a controller for the propelling means and mounted on the carriage, means on the trackway and cooperating with the controller to operate the same to stop travel of the carriage at a predetermined point in its travel, a buffer element on the carriage for movement relative thereto upon engagement with an obstruction, a thrust rod actuated by the buffer plate, and an operating rod operated by the thrust rod and adapted to operate said controller to stop the carriage.

33. In a mold-ramming machine, a carriage adapted to travel across a mold, a vertically reciprocating rammer on the carriage, means on the carriage to reciprocate the rammer during travel of the carriage, and means whereby the rammer when in contact with the mold is permitted to maintain its position relative to the mold irrespective of the travel of the carriage.

34. In a mold-ramming machine, a carriage adapted to travel across a mold, a vertically reciprocating rammer on the carriage, means on the carriage to reciprocate the rammer during travel of the carriage, and yielding means between the rammer and a fixed point on the carriage whereby the rammer when in contact with the mold is permitted to maintain its position relative to the mold irrespective of the travel of the carriage.

35. In a mold-ramming machine, a carriage adapted to travel across a mold, a vertically reciprocating member, a rammer pivotally suspended from said member, means for guiding said member, and a link member connected to the rammer and the carriage and permitting relative movement between the rammer and said member.

36. In a mold-ramming machine, a carriage adapted to travel across a mold, a vertically reciprocating connecting rod, a rammer pivotally suspended from said rod, means for guiding said rod, and a link member connecting the rammer and carriage and permitting relative movement between the rammer and said connecting rod.

37. In a mold-ramming machine, a carriage adapted to travel across a mold, a vertically reciprocating member, a rammer pivotally suspended from said member, means for guiding said member, a link connected to the rammer, and a yielding connection between said link and the carriage.

38. In a mold-ramming machine, a carriage adapted to travel across a mold, a vertically reciprocating member, a rammer pivotally suspended from said member, means for guiding said member, a link connected to the rammer and slidingly engaging the carriage, and yielding and recovering means acting on said link.

39. In a mold-ramming machine, a carriage adapted to travel across a mold, a vertically reciprocating member, a rammer pivotally suspended from said member, means for guiding said member, a link connected to the rammer, a bracket pivoted on the carriage and slidingly engaged by said link, and yielding and recovering means carried by said bracket and cooperating with said link.

40. In a mold-ramming machine, a carriage adapted to travel across a mold, a vertically reciprocating member, a rammer pivotally suspended from said member, means for guiding said member, a link connected to the rammer, a bracket pivoted on the carriage and slidingly engaged by said link, and springs carried by said bracket and permitting relative movement between the rammer and said member whereby the rammer when in contact with the mold is permitted to maintain its position relative to the mold irrespective of the travel of the carriage.

41. In a mold-ramming machine, a carriage adapted to travel across a mold, a vertically reciprocating member, a rammer pivotally suspended from said member, a guide link for guiding said member, and a link member connected to the rammer and the carriage and permitting relative movement between the rammer and said vertically reciprocable member.

42. In a mold-ramming machine, a carriage adapted to travel across a mold, a vertically reciprocating member, a rammer pivotally suspended from said member, a rigid guide link connected to said member and the carriage for guiding said member, and a link member connected to the rammer and the carriage and permitting relative movement between the rammer and said vertically reciprocable member.

43. In a mold-ramming machine, a carriage adapted to travel across a mold, a vertically reciprocating member, a rammer pivotally suspended from said member, means for guiding said member, an extensible and retractible link connecting the rammer and the carriage, and yielding and recovering means associated with said link to permit relative movement between the rammer and said member whereby the rammer when in contact with the mold is permitted to maintain its position relative to the mold irrespective of the travel of the carriage.

44. In a mold-ramming machine, a carriage adapted to travel across a mold, a vertically reciprocating member, a rammer pivotally suspended from said member, a rigid guide link connecting said member with the carriage, and a yielding link connecting the rammer with the carriage and permitting relative movement between the rammer and said member whereby the rammer when in contact with the mold is permitted to maintain its position relative to the mold irrespective of the travel of the carriage.

45. In combination, a mold, a supporting frame, ramming means on the frame and located over the mold, means for causing a relative reciprocatory movement between the mold and the frame, and means whereby the ramming means is actuated to ram the mold during both movements of a reciprocation.

46. In combination, a mold, a supporting frame, ramming means on the frame and located over the mold, means for causing a relative reciprocatory movement between the mold and the frame, means whereby the ramming means is actuated to ram the mold during both movements of a reciprocation, and means for automatically stopping actuation of the ramming means at the end of a reciprocation.

47. In a mold ramming machine, a frame, a vertically reciprocating member on the frame, a rammer pivotally suspended from said member, means for guiding said member in its reciprocations, a link member connected to the rammer, and a yielding connection between said link member and the frame.

48. In a mold ramming machine, a mold support, a supporting frame, means for reciprocating one of the same relative to the other, said means comprising an endless driven member, means for automatically connecting the reciprocatory element to the opposite runs of said endless member alternately, and ramming means on said supporting frame.

49. In a mold-ramming machine, a carriage adapted to travel across a mold, a vertically reciprocating member, a rammer pivotally suspended from said member, and a rigid link member pivoted to said reciprocating member and to the carriage.

50. In a mold-ramming machine, a carriage adapted to travel across a mold, a vertically reciprocating member, a rammer pivotally suspended from said member, and a rigid link member pivoted at one end to said reciprocating member coincidently with the pivot of the rammer, and at its other end to the carriage whereby said member is guided in its vertical movement.

51. In a mold-ramming machine, a trackway, a carriage reciprocable on said trackway, a horizontal power shaft extending transversely of said carriage, means for driving said power shaft, a depending connecting rod driven by said shaft, a hanger element suspended from said connecting rod, rammer means carried by said hanger element, means for guiding vertical movement of said connecting rod, and means for guiding movement of said hanger element and including means permitting relative movement between the said element and the carriage in the direction of movement of the carriage.

52. In a mold-ramming machine, a carriage adapted to travel across a mold, means for propelling the carriage, ramming means on the carriage, and guard-members yieldingly supported at the sides of the carriage, and adapted to co-operate with a mold to prevent displacement of sand.

53. In a mold-ramming machine, a carriage adapted to travel across a mold, means for propelling the carriage, ramming means on the carriage, guard-plates yieldingly supported at the sides of the carriage for vertical movement, and means for guiding the plates during such movement.

54. In a mold-ramming machine, a carriage adapted to travel across a mold, means for propelling the carriage, ramming means on the carriage, and a distributing member comprising oppositely inclined plates for distributing and levelling the sand before being rammed.

55. In a mold ramming machine, a carriage, means for reciprocating the carriage across a mold, ramming means on the carriage, and a striker member on the carriage and operable to strike the sand in a mold during movement of the carriage across the mold, said striker member having a serrated lower edge.

56. In a mold-ramming machine, a carriage, means for moving the carriage forward and backward across a mold, ramming means on the carriage and operable to ram the mold on the forward and backward movement of the carriage, a strike member on the carriage in advance of the ramming means on its forward movement, and means whereby said member is ineffective during forward movement of the carriage but operates to strike the sand in a mold in rear of the ramming means during backward movement of the carriage.

57. In a mold-ramming machine, a carriage, means for moving the carriage forward and backward across a mold, ramming means on the carriage and operable to ram the mold on the forward and backward movement of the carriage, a strike member pivoted on the carriage in advance of the ramming means on its forward movement, means for normally supporting said member in a downward and rearward inclined position relative to forward travel of the carriage, whereby said member may swing on its pivot away from the mold during forward movement of the carriage, but during backward movement of the carriage maintains its normal position to thereby strike the sand in the mold in rear of the ramming means.

58. In a mold-ramming machine, a carriage, means for moving the carriage forward and backward across a mold, ramming means on the carriage and operable to ram the mold on the forward and backward movement of the carriage, a strike member on the carriage in advance of the ramming means on its forward movement, means whereby said member is ineffective during forward movement of the carriage but operates to strike the sand in a mold in rear of the ramming means during backward movement of the carriage, and a sand-distributing member located between said ramming means and said strike member and acting to distribute the sand on the forward movement of the carriage.

59. In a mold-ramming machine, a carriage, means for moving the carriage forward and backward across a mold, ramming means on the carriage and operable to ram the mold on the forward and backward movement of the carriage, a strike member on the carriage in advance of the ramming means on its forward movement, means whereby said member is ineffective during forward movement of the carriage but operates to strike the sand in a mold in rear of the ramming means during backward movement of the carriage, and a sand-distributing member including oppositely and rearwardly inclined elements located between said ramming means and said strike member and acting to distribute the sand on the forward movement of the carriage.

60. In a mold-ramming machine, a carriage, means for moving the carriage forward and backward across a mold, ramming means on the carriage and operable to ram the mold on the forward and backward movement of the carriage, brackets on the carriage in front of the ramming means, a strike member pivoted on said brackets, and stop means for maintaining the strike member inclined downwardly and rearwardly from its pivot toward said ramming means, whereby said member may swing upward on its pivot away from the mold during forward movement of the carriage, but during backward movement of the carriage maintains its normal position to thereby strike the sand in the mold in rear of the ramming means.

61. In a mold-ramming machine, a carriage, a trackway for supporting the carriage, ramming means carried by the carriage, an endless member, means for driving said member in one direction, and means for establishing a driving engagement between the carriage and opposite runs of said member alternately to thereby reciprocate the carriage.

In witness whereof, we have hereunto subscribed our names in the presence of two witnesses.

RILEY L. REDPATH.
SHERWOOD C. BLISS.

Witnesses:
EVERETT STEELE,
MARY E. COFFEY.